(12) United States Patent
Casarotto et al.

(10) Patent No.: US 12,545,058 B2
(45) Date of Patent: Feb. 10, 2026

(54) VEHICLE WHEEL TYRE

(71) Applicant: PIRELLI TYRE S.p.A., Milan (IT)

(72) Inventors: Giovanni Casarotto, Milan (IT); Riccardo Guerra, Milan (IT); Diego Ettore Speziari, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 0 days.

(21) Appl. No.: 18/864,851

(22) PCT Filed: Jun. 6, 2023

(86) PCT No.: PCT/IB2023/055820
§ 371 (c)(1),
(2) Date: Nov. 11, 2024

(87) PCT Pub. No.: WO2023/238027
PCT Pub. Date: Dec. 14, 2023

(65) Prior Publication Data
US 2025/0303800 A1    Oct. 2, 2025

(30) Foreign Application Priority Data
Jun. 10, 2022   (IT) ......................... 102022000012368

(51) Int. Cl.
*B60C 11/12*   (2006.01)
*B60C 11/13*   (2006.01)

(52) U.S. Cl.
CPC ...... *B60C 11/1392* (2013.01); *B60C 11/1236* (2013.01)

(58) Field of Classification Search
CPC ............ B60C 11/1384; B60C 11/1392; B60C 11/1236
See application file for complete search history.

(56) References Cited

U.S. PATENT DOCUMENTS

2017/0232800 A1 * 8/2017 Kanematsu ............ B60C 11/04
152/209.18
2018/0370290 A1  12/2018 Hirosue et al.
(Continued)

FOREIGN PATENT DOCUMENTS

| EP | 3205516 A1 | 8/2017 |
| EP | 3213933 A1 | 9/2017 |

(Continued)

OTHER PUBLICATIONS

English machine translation of JPH05-262107 (Year: 1993).*
(Continued)

*Primary Examiner* — Robert C Dye
(74) *Attorney, Agent, or Firm* — Steinfl + Bruno LLP

(57) ABSTRACT

A vehicle wheel tyre comprises a tread band, a tread surface, a plurality of blocks defined on the tread band, and at least one sipe formed on at least one of the blocks. The at least one sipe is open on a tread surface portion and at least on one first edge of the block, to define at least one first edge portion and at least one second edge portion adjacent to each other and at least partially bounded by the sipe. The first edge portion is defined by a chamfer extending between the tread surface portion and a wall of the block, and the second edge portion is defined by a corner resulting from the tread surface portion intersecting the wall.

14 Claims, 1 Drawing Sheet

(56) References Cited

U.S. PATENT DOCUMENTS

2021/0276370 A1    9/2021  Mizushima
2024/0343069 A1 * 10/2024  Yagi ................... B60C 11/0302

FOREIGN PATENT DOCUMENTS

| | | | |
|---|---|---|---|
| JP | 05262107 A * | 10/1993 | |
| WO | 2014/077271 A1 | 5/2014 | |
| WO | WO-2017209743 A1 * | 12/2017 | ......... B60C 11/1281 |
| WO | 2019/030664 A1 | 2/2019 | |
| WO | 2019/111089 A1 | 6/2019 | |
| WO | 2023/238027 A1 | 12/2023 | |

OTHER PUBLICATIONS

International Search Report and Written Opinion issued for International PCT Application No. PCT/IB2023/055820 filed on Jun. 6, 2023 on behalf of Pirelli Tyre S.P.A. Mail Date: Sep. 27, 2023. 10 pages.

* cited by examiner

VEHICLE WHEEL TYRE

CROSS REFERENCE TO RELATED APPLICATIONS

The present application is the U.S. National Stage of International Application No. PCT/IB2023/055820 filed on Jun. 6, 2023, which, in turn, claims priority to Italian Patent Application No. 102022000012368 filed on Jun. 10, 2022.

The present invention relates to a vehicle wheel tyre, in particular a winter tyre.

A tyre generally comprises a carcass structure toroidally shaped around a rotation axis and including at least one carcass ply with end flaps engaged in respective anchoring annular structures, called bead cores.

In a position radially external to the carcass structure, there is provided a belt structure comprising, in the case of car tyres, at least two radially overlapping strips of rubberised fabric provided with reinforcing cords, usually metallic, arranged in each strip parallel to each other but crossed over with respect to the cords of the adjacent strip, preferably symmetrically with respect to the equatorial plane of the tyre.

Preferably, the belt structure also includes in a radially outer position, at least on the ends of the underlying belt strips, also a third layer of textile or metal cords, arranged circumferentially (at 0 degrees). In tubeless-type tyres, there is also a radially inner layer, known as a "liner", which possesses water-proof characteristics to ensure airtightness of the tyre itself.

A tread band made of elastomeric material is applied radially outside the belt structure, on which a tread surface intended to contact the road surface is defined.

In order to ensure an appropriate road holding even on a wet road surface, tyres have a tread band provided with grooves of various shapes and geometry whose main function is to evacuate the water present between the surface of the tyre and the road surface when they mutually contact, preventing the hydrostatic pressure resulting from the impact of water against the tyre as it moves forward from causing the tyre to lift even partially off the road surface and the consequent loss of control of the vehicle (a phenomenon known as "aquaplaning").

The grooves obtained in a circumferential direction also affect the tyre directional characteristics and travel stability in relation to the tyre ability to bear tangential stresses parallel to the tyre rotation axis.

The grooves obtained in the transverse direction, in turn, affect the tyre traction characteristics, i.e. its ability to transmit to the road surface tangential stresses parallel to the travel direction, particularly during acceleration and braking of the vehicle.

The grooves, as a whole, define a plurality of blocks on the tread band, each of which comprises a radially outer surface intended to contact the road surface, and which, therefore, forms a portion of the tread surface of the tyre. Each block is also bounded, at least partially, by one or more walls defined by the grooves surrounding it.

In some cases, a wall of a block, or a portion thereof, is connected to the tread surface of the block by a chamfer, typically formed by a plane, suitably slanted with respect to the wall and the tread surface, defining an edge of the block.

In the case of winter tyres, small grooves, known as "sipes", are usually obtained in the tread band blocks, extending from the tread surface of the tyre towards the inside of the block. The function of the sipes is to provide additional grip elements when driving on snowy surfaces and to retain a certain amount of snow, thereby improving grip with the road surface.

WO 2019111089, to the same Applicant, discloses a tyre without sipes wherein some edges of blocks or ribs are chamfered.

WO 2019030664, to the same Applicant, shows an example of a winter tyre wherein the blocks are provided with respective pluralities of sipes, open at the longitudinal ends on the opposite block walls.

A "circumferential" direction refers to a direction generally pointing to the rotation direction of the tyre, or, in any case, slightly slanted (at most of about 5°) in relation to the rotation direction of the tyre.

"Axial" direction refers to a direction that is substantially parallel to the rotation axis of the tyre, or, at most, slightly slanted (at most of about 5°) relative to that rotation axis of the tyre. The axial direction is generally perpendicular to the circumferential direction.

The term "equatorial plane" of the tyre refers to an axial centreline plane perpendicular to the rotation axis of the tyre.

"Shoulder regions" of the tread band refer to the tread band portions circumferentially extended in an axially external position to the tread band itself.

Preferably, each shoulder region is extended over a width of at least 10% of the width of the tread band.

The term "groove" refers to a recess obtained in a portion of tread band, having a width greater than or equal to 1.5 mm, and preferably a depth greater than 3 mm.

The term "sipe" refers to a recess obtained in a portion of the tread band, having a width lower than 1.5 mm, preferably lower than or equal to 1 mm.

A "block" is defined as a portion of the tread surface bounded by at least one groove, preferably at least two separate grooves, on which a portion of the tread surface intended to contact the road surface is defined, on its radially outer surface.

Therefore, either a portion of a closed contour tread band delimited by three or more grooves or a circumferential rib delimited by a pair of grooves extended circumferentially about the tread band are considered as blocks.

A "central block" is defined as a block not bounded by the axial ends of the tread band, while a block partially bounded by one of the axial ends of the tread band is defined as a "shoulder block".

A "wall" of a block refers to the surface generally extending towards the tread surface portion of the block from a bottom of a groove bounding the block.

An "edge" of a block refers to the block region that joins a wall of the block with the tread surface portion of the block. The edge as defined above is to be considered as distinguished from said wall (i.e. the edge is not part of the wall).

When the block is completely bounded by grooves, the edge then defines the perimeter contour of the tread surface portion of the block.

A part of the edge into which a first end of a sipe obtained on the block opens can be identified as the "first edge". In case a plurality of sipes is obtained on the block, wherein the first ends are open on the edge, the "first edge" may be identified with the edge part of the block into which the respective first ends of the plurality of sipes open.

Similarly, when the sipe or the plurality of sipes open with their respective second end, opposed to said first end, into a different part of the edge, such different part of the edge can be identified as a "second edge".

It will be noted, therefore, that the definition of "first edge" or "second edge" cannot be attributed solely to the geometric design of the block, but it is instead closely related to the presence and design of the sipe or plurality of sipes on the block.

The edge, or a part of it, may be formed by a corner, where the wall directly intersects the tread surface portion, or it may be formed by a connecting surface that connects the wall with the tread surface portion.

The "chamfer" of a block refers to such a connecting surface.

Preferably the chamfer is formed by a plane surface, but it can also take on a rounded shape.

If the chamfer is formed by a plane surface, the chamfer is slanted with respect to both the tread surface and the wall of the block.

The "width" of a chamfer refers to the measure of the orthogonal projection of that surface onto the tread surface calculated in a direction substantially perpendicular to the longitudinal direction of the edge on which it is obtained.

Two or more edge portions have a "substantially equal" length when their respective lengths differ from each other by, at most, 10% of the greater length.

Two or more directions, or two or more elements extended along respective directions, such as two or more sipes, are "substantially parallel" when they are slanted to each other by an angle lower than 10°, preferably lower than 5°.

The Applicant observed that the performance of a tyre on snowy surfaces depends to a great extent on the number and size of the sipes on the blocks, so that, for the same tread pattern, a block on which more sipes are obtained is able to offer a better behaviour on the snow.

The Applicant, however, also noted that the presence of the sipes weakens the structure of the block, making it less rigid and thus decreasing the ability to bear external stresses, in particular tangential stresses.

As a result of this weakening, during braking, acceleration or cornering, the tyre block can be significantly deformed, leading to a partial lifting of the block from the road surface with a consequent reduction in the contact area between the block and the road surface and, consequently, of the overall friction force exerted by the tyre on the road surface.

In other words, the Applicant has observed that the provision of a high number of sipes on a block, while on the one hand improves the behaviour of the block on snowy ground, can hinder the performance of the block in terms of road holding on both dry and wet road surfaces.

The Applicant therefore felt the need to provide a winter tyre capable of offering excellent performance on snowy roads despite having a small number of sipes on the blocks.

In order to meet this requirement, the Applicant considered the possibility of introducing chamfers at the edges of the block in order to increase the gripping corners. However, the provision of a continuous chamfer on the edge of the block may cause a reduction in the tread surface of the block, reducing the tyre surface in contact with the road surface, as well as a weakening of the rigidity of the block.

The Applicant noted, however, that a chamfer obtained on a block edge portion adjacent to a portion of a "sharp-corner" edge, i.e. defined by the wall of the block intersecting the tread surface of the block, defines additional gripping corners precisely at the end of the sharp-corner edge portion facing the chamfered edge portion.

The Applicant further noted that the provision of sipes on the block offers a "natural" subdivision of the block into adjacent portions, each portion being bounded by a pair of sipes, and that if these sipes are open on the wall of the block, the corresponding edge is also subdivided by the sipes into successive portions.

The Applicant therefore realised that it could advantageously take advantage of this edge subdivision to introduce a chamfer in some of these edge portions while leaving other edge portions as sharp-corners (i.e. without a chamfer), so as to create new gripping corners without thereby excessively reducing the tread surface of the block.

The Applicant, finally, has found that a block on which at least one sipe is obtained that is open on the tread surface and on at least one first edge of the block, so as to define at least one first and one second edge portion adjacent to each other and bounded by said at least one sipe, wherein the first edge portion is defined by a chamfer and the second edge portion is defined by a sharp corner, i.e. an edge resulting from the tread surface intersecting the wall of the block, provides the tread with excellent behaviour on both snowy and dry or wet road surfaces.

In particular, the invention, in a first aspect thereof, relates to a vehicle wheel tyre comprising a tread band and a tread surface radially external to said tread band.

Preferably a plurality of blocks is defined on said tread band.

Preferably, at least one sipe is obtained on at least one block of that plurality of blocks.

Preferably, said at least one sipe is open on a tread surface portion of said block.

Preferably, said at least one sipe is open on at least a first edge of said block.

Preferably, said at least one sipe defines at least a first edge portion and at least a second edge portion.

Preferably, said at least one second edge portion is adjacent to said at least one first edge portion.

Preferably, said at least one first edge portion and said at least one second edge portion are at least partially bounded by said at least one sipe.

Preferably, said at least one first edge portion is defined by a chamfer extending between said tread surface portion and a wall of said block.

Preferably, said at least one second edge portion is defined by a corner resulting from said tyre band portion intersecting said wall.

The Applicant considers that thanks to these characteristics, the block has a high number of gripping corners, which are useful for improving the behaviour of the tyre on snow-covered roads, without, however, losing too much tread surface area, and without significantly hindering the rigidity of the block.

The present invention, in the above-mentioned aspect, may have at least one of the further preferred features listed below.

In some embodiments, said at least one sipe is open on said first edge at a straight or curved section of said first edge.

In some embodiments, said at least one sipe is open on said first edge at a point having a continuous tangent.

In other words, the at least one sipe is preferably open at a point on the first edge that does not correspond to a vertex on the perimeter contour of the block.

Preferably, a plurality of said sipes is obtained on said at least one block of said plurality of blocks.

In some embodiments, on said first edge they are defined, by means of said plurality of said sipes, at least two of said first edge portions arranged alternating with a second edge portion.

In some embodiments, on said first edge they are defined, by means of said plurality of said sipes, at least two of said second edge portions arranged alternating with a first edge portion.

In some embodiments, on said first edge they are defined, by means of said plurality of said sipes, at least two of said second edge portions and at least two of said second edge portions arranged alternating with each other.

In this way, the number of gripping corners formed by arranging a first edge portion adjacent to a second edge portion is advantageously maximised.

In some embodiments, said chamfer comprises a surface slanted by an angle of between 30° and 60°, and preferably of about 45°, relative to said tread surface.

Preferably, said a slanted surface is a plane surface.

In some embodiments, said chamfer has a width of between 0.5 mm and 3 mm.

In some embodiments, on said first edge, there are defined, by means of said plurality of said sipes, a plurality of said first edge portions.

Preferably, all the first edge portions defined on said first edge have a substantially equal length.

In some embodiments, said at least one first edge portion and said at least one second edge portion have a length of between 4 mm and 8 mm.

In some embodiments, on said first edge, there are defined, by said plurality of said sipes, a plurality of said second edge portions.

Preferably, all the second edge portions defined on said first edge have a substantially equal length.

In some embodiments, said at least one first edge portion and said at least one second edge portion have a substantially equal length.

In some embodiments, said sipes are substantially parallel to each other.

In some embodiments, said at least one sipe is also open on a second edge of said block.

In some embodiments, said at least one sipe is open on said second edge at a straight or curved section of said second edge.

In some embodiments, said at least one sipe is open on said second edge at a point with a continuous tangent.

In other words, at least one sipe is preferably open at a point on the second edge that does not correspond to a vertex on the perimeter contour of the block.

Preferably, said second edge is distinct from said first edge.

In some embodiments, said at least one sipe also partially defines on said second edge at least one of said first edge portions and at least one of said second edge portions.

Preferably, on said second edge, said at least one of said second edge portions is adjacent to said at least one of said first edge portions.

In this way, the formation of additional gripping corners is advantageously extended to more edges of the block with an increase in the overall tyre performance.

In some embodiments, at least one region of said block is bounded by said at least one sipe.

Preferably, said region, at the opposite ends of said region, is bounded by one of said first edge portions and one of said second edge portions.

In some embodiments, said at least one region of said block is bounded by a pair of said sipes.

In some embodiments, each region of said block bounded by a pair of said sipes is bounded, at the opposite ends of said region, by one of said first edge portions and one of said second edge portions.

Thereby, the structure of the block, and thus its stiffness characteristics, is balanced in such a way as to favour an even behaviour of the block when subjected to tangential stresses. In some embodiments, said blocks of said plurality of blocks are central blocks.

In other words, said blocks are all the blocks of the tread band, except for the blocks that are partly bounded by an axial end of the tread band.

The characteristics and advantages of the invention will become clearer from the detailed description of some preferred embodiments thereof, shown by way of a non-limiting example, with reference to the appended drawings, wherein.

Figure 1:
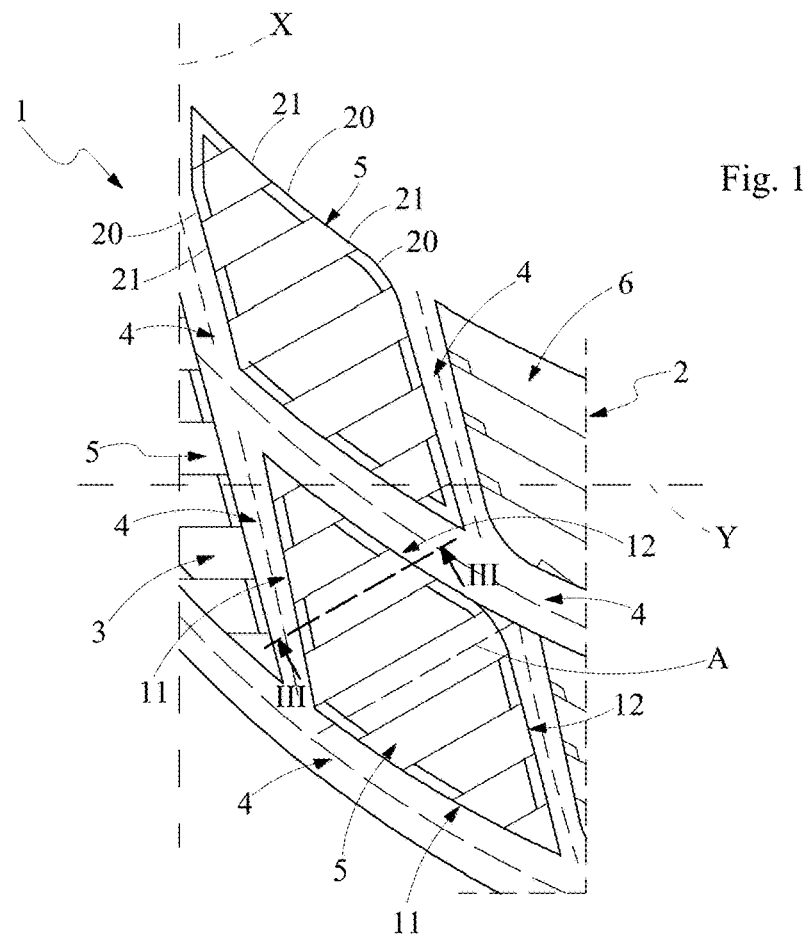
FIG. 1 is a front schematic view of a tread band portion of a vehicle wheel tyre made according to the present invention.

With reference to the enclosed figures, 1 globally refers to a vehicle wheel tyre, made according to the present invention.

The tyre 1 has a conventional toroidal shape developed around a rotation axis, defining an axial direction Y of the tyre, and crossed by an equatorial plane X, perpendicular to the rotation axis.

The tyre 1 comprises a tread band 2 on which a tread surface 3 is defined, arranged radially outside the tread band 2 and intended to contact a road surface.

The tyre 1, for example, has a nominal section width of approximately 205 mm with a 16-inch rim diameter.

On the tread band 2 they are defined a central region, extending circumferentially and symmetrically around the equatorial plane X, as well as a pair of shoulder regions, extending respectively to the axially opposite sides of the central region, in an axially external position to the tread band 2 up to the respective axial ends of the tread band 2.

On the tread band 2 a plurality of grooves is obtained, all grooves referred to as 4, which delimit a respective plurality of blocks 5 formed on the tread band 2 and in particular in its central region. Since the blocks 5 are completely delimited by grooves 4, they are therefore central blocks.

The grooves 4 also partially define the shoulder blocks 6, which are formed on the shoulder regions and are bounded on their axial side by an axial end of the tread band 2.

In the embodiment herein described, the grooves 4 have a depth of between 3 mm and 9 mm and a width of between 2.5 mm and 9.5 mm.

Figure 2:
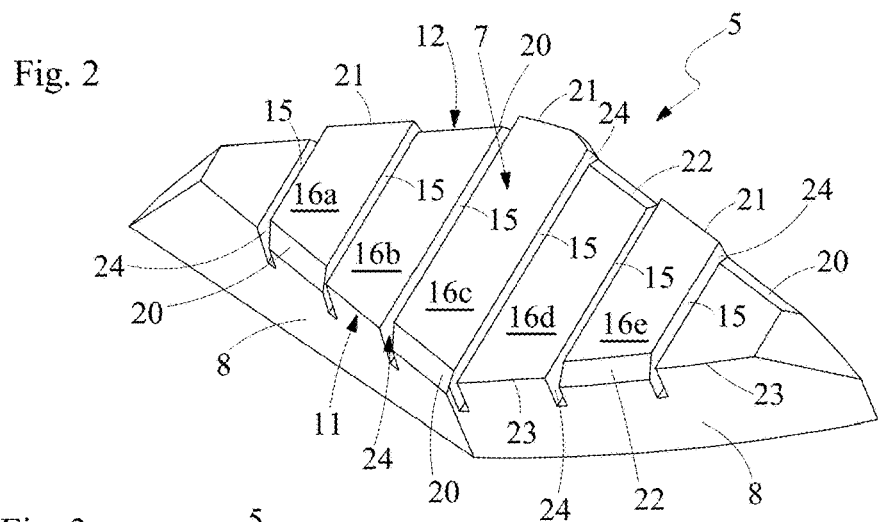
FIG. 2 is a perspective schematic view in an enlarged scale of a block of the tread band of the tyre in FIG. 1.
Figure 3:
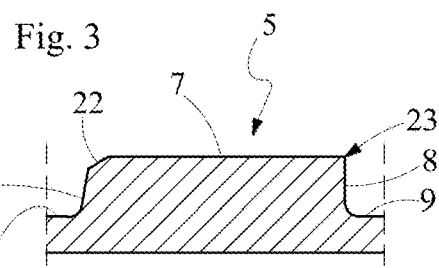
FIG. 3 is a cross-sectional view along line III-III of a block of the tread band of the tyre in FIG. 1.

As an example, in FIG. 2, a block 5 is schematically represented on the central region of the tread band 2, it being understood that the same considerations apply similarly to all other central blocks of the tread band, except for the shoulder blocks 6.

The block 5 comprises a tread surface portion 7, defined on its radially outer surface and intended to contact the road surface, as well as a plurality of walls 8, extended towards the tread surface portion 7 by respective bottoms 9 of the grooves 4 delimiting the block 5.

Each wall 8 is extended from the bottom of the groove 4 towards the tread surface portion 7 with a substantially constant inclination, slightly divergent from the radial direction of the tyre with which it forms an angle between about 2° and about 20°, for example about 5°, about 10° or about 15°.

The walls 8 are joined to the tread surface portion 7 to define the edges of the block 5.

In the example of the block 5 shown in FIG. 2, which has a generic rhombus-shaped design, a first edge 11, formed by a pair of adjacent sides of the rhombus, and a second edge 12, formed by the other pair of adjacent sides of the rhombus, can be identified.

On the block 5 at least one sipe 15 is obtained that is open on the tread surface portion 7 and extending along a prevalent longitudinal direction referred to as A in the figures.

Said at least one sipe 15 has a width of about 0.5 mm and a depth ranging from 3 mm to 7 mm.

In the example of block 5 shown in the figures, a plurality of sipes 15 is preferably obtained, all extending parallel to the longitudinal direction A.

The longitudinal direction A is slanted by approximately 60° to the equatorial plane X, however, it is provided that this longitudinal direction may have different inclinations, as well as being parallel to the axial direction Y.

Each sipe 15 extends along the longitudinal direction A passing through the block 5, so that it is also open on the walls 8 and, consequently, on the edges of the block 5. In particular, in the block 5 shown in FIG. 2, the sipes 15 extend passing between the first edge 11 and the second edge 12.

Each sipe 15 may have a straight design as in the example of the block 5 shown in the figures, however, it is provided that each sipe 15 may take in other designs, e.g. curvilinear or broken-line or even a zigzag design.

The sipes 15, when three or more in number, are also equally-spaced from each other, preferably between about 4 mm and about 8 mm, more preferably between about 5 mm and about 6 mm.

In the example shown in FIG. 5, the sipes 15 subdivide the block 5 into block regions 16a, 16b, 16c, 16d, 16e one adjacent to the other. Each block region 16a, 16b, 16c, 16d, 16e is bounded by a pair of sipes 15 and, at their longitudinally opposite ends, by a portion of the first edge 11 and, respectively, by a portion of the second edge 12. Consequently, the first edge 11 and the second edge 12 are also divided by the sipes 15 into adjacent and distinct portions.

In particular, the first edge 11 is subdivided into a plurality of first edge portions 20 and a plurality of second edge portions 21, alternating with each other, wherein each first edge portion 20 is defined by a chamfer 22 extending between the tread surface portion 7 and a wall 8 of the block 5, while each second edge portion 21 is defined by a corner 23 resulting from the tread surface portion 7 intersecting a wall 8 of the block 5.

In other words, the first edge 11 is formed by alternating chamfers 22 and corners 23, all having substantially the same length.

Each chamfer 22 consists of a plane surface slanted by an angle of approximately 45° with respect to the tread surface portion 7 and has a length of approximately 5-6 mm and a width of approximately 2 mm. The chamfer 22 is also slanted with respect to the wall 8 by a non-zero angle and a function of the inclination of the wall with respect to the radial direction, as indicated above.

It will be noted that the provision of a chamfer 22 defines, at its longitudinal ends, a step formation 24 in the block regions adjacent to it wherein a second edge portion 21 is defined. It will also be noted that each step formation 24 is bounded by corners that favour the grip of the block 5 on a snow-covered surface.

Similarly to the first edge 11, the second edge 12 is also subdivided by the sipes 15 into a plurality of first edge portions 20, defined by a chamfer 22, and a plurality of second edge portions 21, defined by a corner 23, alternating with each other.

Therefore, the second edge 12 is also formed by alternating chamfers 22 and corners 23, all having substantially the same length.

However, it is expected that the alternating arrangement of chamfers 22 and corners 23 in the first edge 11 will be offset from the alternating arrangement of chamfers 22 and corners 23 in the second edge 12. Thereby, each first edge portion 20 defined on the first edge 11 corresponds, moving along the longitudinal direction A, to a second edge portion 21 defined on the second edge 12, and vice versa.

Accordingly, each region 16a, 16b, 16c, 16d, 16e of the block 5 is bounded, at the opposite longitudinal ends, by a first edge portion 20 (defined by a chamfer 22) and a second edge portion 21 (defined by a corner 23).

The invention claimed is:

1. A vehicle wheel tyre comprising:
a tread band,
a tread surface radially external to said tread band,
a plurality of blocks defined on said tread band,
a sipe formed on a block of said plurality of blocks, said sipe being open on a tread surface portion of said block and on a first edge of said block, to define a first edge portion and a second edge portion adjacent to said first edge portion, said first edge portion and said second edge portion being at least partially bounded by said sipe, and
a plurality of said sipes including said sipe, the plurality of said sipes formed on said block of said plurality of blocks,
wherein:
said first edge portion is defined by a chamfer extending between said tread surface portion and a wall of said block,
said second edge portion is defined by a corner resulting from said tread surface portion intersecting said wall,
on said first edge, said plurality of said sipes define a plurality of first edge portions including the first edge portion,
the plurality of first edge portions are arranged alternating with the second edge portion, and
each first edge portion of the plurality of first edge portions is defined between respective pairs of successive sipes of the plurality of sipes.

2. The tyre according to claim 1, wherein;
on said first edge, said plurality of said sipes define a plurality of second edge portions including the second edge portion,
the plurality of second edge portions are arranged alternating with the first edge portion, and
each second edge portion of the plurality of second edge portions is defined between respective pairs of successive sipes of the plurality of sipes.

3. The tyre according to claim 2, wherein the plurality of first edge portions and the plurality of second edge portions are arranged alternating with each other.

4. The tyre according to claim 2, wherein the plurality of second edge portions have a length within 10% of each other.

5. The tyre according to claim 2, wherein one region of said block is bounded by said sipe and, at opposite ends of said region, is bounded by one of said first edge portions and one of said second edge portions.

6. The tyre according to claim 5, wherein said region of said block is further bounded by a second sipe of said plurality of said sipes.

7. The tyre according to claim 5, further comprising a plurality of regions of said block including said region of said block, wherein each region of the plurality of regions of said block is bounded by two sipes of said plurality of said sipes and, at opposite ends of each region, is bounded by a respective first edge portion of said plurality of first edge portions and a respective second edge portion of said plurality of second edge portions.

8. The tyre according to claim 1, wherein said chamfer comprises a chamfer surface slanted with respect to said tread surface by an angle of between 30° and 60°.

9. The tyre according to claim 1, wherein said chamfer has a width of between 0.5 mm and 3 mm.

10. The tyre according to claim 1, wherein the plurality of first edge portions have a length within 10% of each other.

11. The tyre according to claim 1, wherein said first edge portion and said second edge portion have a length within 10% of each other.

12. The tyre according to claim 1, wherein said plurality of said sipes are slanted by an angle smaller than 10° with respect to each other.

13. The tyre according to claim 1, wherein said sipe is open on a second edge of said block and defines another first edge portion and another second edge portion.

14. The tyre according to claim 1, wherein said block of said plurality of blocks is a central block.

* * * * *